United States Patent [19]
Mason et al.

[11] 3,758,558
[45] Sept. 11, 1973

[54] ORTHO-DIPHENYLPHOSPHINOBENZOIC ACID PRODUCTION

[75] Inventors: Ronald F. Mason, Mill Valley; Gordon E. Wicker, Orinda, both of Calif.

[73] Assignee: Shell Oil Company, Houston, Tex.

[22] Filed: Jan. 13, 1972

[21] Appl. No.: 217,635

[52] U.S. Cl. .................. 260/515 M, 260/683.15
[51] Int. Cl. ................................... C07c 63/44
[58] Field of Search ........................... 260/515 M

[56] References Cited
OTHER PUBLICATIONS
Schindlbauer Monatsh. Chem. Vol. 96(3) (1965) pp. 1021–4.

*Primary Examiner*—James A. Patten
*Attorney*—Howard W. Haworth and Martin S. Baer

[57] ABSTRACT

Ortho-dihydrocarbylphosphinobenzoic acids are produced in high yield substantially free of the corresponding meta-isomer by substantially immediate intimate contacting of sodium dihydrocarbyl phosphide and phenyl sodium with an ortho-chlorobenzoate in an inert solvent solution to produce the sodium salt of o-dihydrocarbylphosphinobenzoic acid, which is thereafter converted to the free acid by treatment with mineral acid.

6 Claims, No Drawings

ORTHO-DIPHENYLPHOSPHINOBENZOIC ACID PRODUCTION

BACKGROUND OF THE INVENTION

1. Field of the Invention

The present invention relates to the production of ortho-dihydrocarbylphosphinobenzoic acids which are compounds of established utility in a variety of applications. Such acids, particularly o-diphenylphosphinobenzoic acid, are useful as chelating agents for transition metals. Alternatively, such acids are employed with certain transition metal salts and reducing agents to form catalysts which oligomerize ethylene to produce linear, alpha-olefins which are useful in forming conventional detergent precursors.

2. Description of the Prior Art

Methods for preparing ortho-dihydrocarbylphosphinobenzoic acids are known. For example, Issleib et al in Zeit. Inorg. Alleg. Chemie, 353, 197–206 (1967) disclose the synthesis of ortho-diphenylphosphinobenzoic acid by reaction of preformed potassium diphenylphosphide with free o-chlorobenzoic acid to produce the potassium salt of diphenylphosphinobenzoic acid, which is then converted to the free acid. This process is not economically attractive in that for each mole of salt of diphenylphosphinobenzoic acid formed, two moles of potassium diphenylphosphide are consumed with the resulting formation of one mole of diphenylphosphine. Other processes, in which the potassium or sodium diphenylphosphide are produced in situ by reaction of triphenylphosphine with the alkali metal, require the destruction of phenyl sodium which is formed as a co-product. Phenyl sodium promotes the formation of the meta-isomer of diphenylphosphinobenzoic acid. Since the meta-isomer is inactive as a catalyst component for the oligomerization of ethylene, its production must be considered as a loss in yield when oligomerization catalyst precursors are desired. It would be an advantage to develop a process for the production of o-dihydrocarbylphosphinobenzoic acids without co-production of appreciable amounts of the meta-isomer and with more efficient utilization of the substituted phosphine reactant.

SUMMARY OF THE INVENTION

It has now been found that an improved method for the production of ortho-dihydrocarbylphosphinobenzoic acids comprises 1) contact of a dihydrocarbylarylphosphine with metallic sodium in liquid ammonia, 2) addition to the reaction mixture of a suitable organic solvent, 3) substantially immediate, intimate contacting of said mixture with free ortho-chlorobenzoic acid, and 4) conversion of the thus formed sodium ortho-dihydrocarbylphosphinobenzoate to ortho-dihydrocarbylphosphinobenzoic acid. The acid is then recovered from the reaction mixture by conventional techniques, e.g., crystallization from a methanol solution. The reaction mixture wherein sodium dihydrocarbylphosphide is rapidly and intimately contacted with o-chlorobenzoic acid results in essentially 100 percent ortho-isomer as the reaction product. The process of the instant invention also provides for more efficient use of substituted phosphine reactant in that only one mole of the phosphine reactant is required for each mole of o-dihydrocarbylphosphinobenzoic acid formed.

DESCRIPTION OF THE PREFERRED EMBODIMENTS

The o-dihydrocarbylphosphinobenzoic acids of this invention generally have from eight to 30 carbon atoms, but preferably from 14 to 20 carbon atoms, and are represented by the formula I:

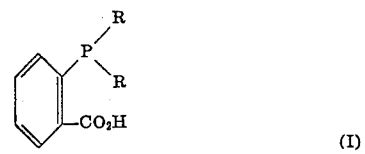

(I)

wherein R independently is a monovalent hydrocarbyl group free from non-aromatic unsaturation, at least one R being aromatic. Illustrative of suitable R groups are hydrocarbon alkyl R groups such as methyl, ethyl, isobutyl, lauryl, stearyl, cyclohexyl and cyclopentyl; and aryl (including alkaryl) R groups such as phenyl, tolyl, xylyl and p-ethyl-phenyl. Preferred R groups are aromatic groups of six to 10 carbon atoms, especially phenyl, and cycloalkyl groups of five to 10 carbon atoms, especially cyclohexyl. Illustrative o-dihydrocarbylphosphinobenzoic acids of formula (I) are o-diphenylphosphinobenzoic acid, o-(methylphenylphosphino)benzoic acid, o-(ethyltolylphosphino)benzoic acid, and o-(cyclohexylphenylphosphino)-benzoic acid.

The dihydrocarbylphosphino moiety results from reacting a trihydrocarbyl phosphine, where the additional hydrocarbyl substituent is aryl, e.g., phenyl, with sodium dissolved in liquid ammonia. The reaction results in the cleavage of an aryl group from the trihydrocarbylphosphine according to the following reaction:

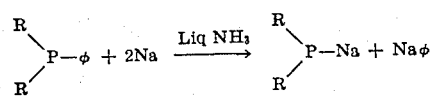

wherein $\phi$ is a monovalent aryl group of from six to 10 carbons and R has the previously stated significance.

The resulting sodium dihydrocarbylphosphide is conventionally reacted with o-chlorobenzoic acid (after first destroying the phenyl sodium by addition of ammonium halide) to produce the desired dihydrocarbylphosphinobenzoic acid according to the following equation:

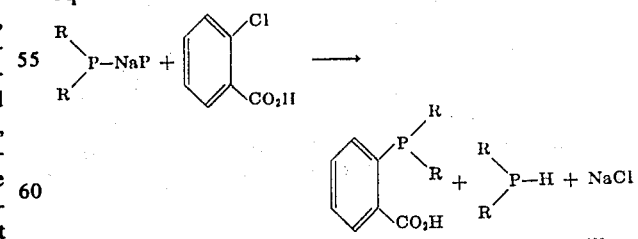

Such a process is unnecessarily wasteful of the dihydrocarbylphosphide anion.

By the process of the instant invention it has been found unnecessary to destroy the phenyl sodium prior to addition of the o-chlorobenzoic acid to the reaction mixture. Indeed, contacting the acid with the sodium dihydrocarbylphosphide/phenyl sodium mixture results in a more efficient use of the dihydrocarbylphosphide anion.

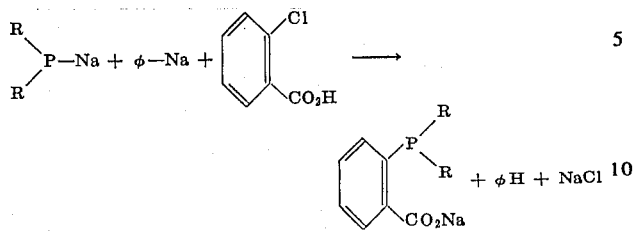

Thus, only one mole of sodium dihydrocarbylphosphide is required for each mole of o-dihydrocarbylphosphinobenzoic acid produced, whereas methods known in the art have required two moles per mole of acid reactant.

It is imperative that there be substantially immediate and intimate contacting of the o-chlorobenzoic acid with the reaction mixture containing both the dihydrocarbylphosphide anion and the phenyl sodium. If the addition of the acid occurs over an extended interval of time, there is produced a mixture of ortho- and meta-isomers of the corresponding dihydrocarbylphosphinobenzoic acid, typically with as much as up to 35 percent meta isomer. With the substantially immediate contacting of reactants, the selectivity to the ortho isomer approaches 100 percent.

PROCESS CONDITIONS

In the process of the instant invention all operations must be performed under an inert gas blanket because of the reactivity of the reactants and intermediates formed toward the atmosphere. The reaction vessel should also be inert to the reaction environment; therefore, glass is a preferred material of construction. The reaction vessel, in addition to providing an inert environment in which to contact the reactants, should be equipped with a means for insuring adequate reactant contacting and adequate temperature control.

The first step of the synthesis requires that metallic sodium be dissolved in liquid ammonia. The sodium is added slowly to liquid ammonia in the reactor under constant agitation. The resulting mixture will exhibit an intensely blue color. The amount of liquid ammonia used is not critical and can vary widely. Typically up to two liters of ammonia per mole of sodium to be dissolved is satisfactory. This mixture is kept substantially in the liquid phase by cooling.

After the sodium is completely dissolved in the liquid ammonia, approximately one mole of the aryl dihydrocarbylphosphine, e.g., from about 0.25 mole to about 0.75 mole is then added to the mixture for each mole of sodium charged to the reactor. Since the reaction of the aryl dihydrocarbylphosphine with metallic sodium is quite exothermic, the addition is typically performed slowly with cooling so as to maintain the mixture substantially in the liquid phase.

After the addition of the sodium is completed, a suitable miscible solvent, e.g., dioxane, is added to the sodium diphenylphosphide-ammonia mixture. Suitable solvents or diluents are polar organic compounds liquid at reaction temperatures in which both the sodium dihydrocarbylphosphide and o-chlorobenzoic acid are soluble. Amounts of solvent of up to 2 liters per mole of sodium dihydrocarbylphosphide are satisfactorily employed at this stage of the synthesis. However, additional solvent is generally added to the reaction mixture as the o-chlorobenzoic acid is generally added as a solution in the same solvent. The total reaction mixture typically contains up to 5 liters of solvent per mole of acid produced.

Illustrative of suitable solvents are polar organic compounds such as organic compounds containing atoms such as oxygen, sulfur and phosphorus incorporated in functional groups, not containing active hydrogen, such as alkoxy, aryloxy, carbalkoxy, alkanoyloxy, and like functional groups. Illustrative oxygenated organic solvents are fully esterified polyacyl esters of polyhydroxy alkanes such as glycerol triacetate; tetraacryl esters of erythritol; diethylene glycol diacetate; cycloalkyl ethers, e.g., dioxane, tetrahydrofuran and tetrahydropyran; acyclic alkyl ethers, e.g., dimethoxyethane, diethyleneglycol dimethyl ether and dibutyl ether; aromatic ethers such as anisole, 1,4-dimethoxybenzene and p-methoxytoluene; and alkylene carbonates such as ethylene carbonate, propylene carbonate and butylene carbonate. Illustrative sulfur-containing solvents are sulfolane and dimethylsulfoxide and illustrative phosphorus-containing solvents are trialkylphosphates, e.g., trimethylphosphate, triethylphosphate and tributylphosphate and hexaalkylphosphoramides such as hexamethylphosphoramide.

Preferred reaction solvents are oxygenated organic solvents, particularly the ethers. Especially preferred are cycloalkyl ethers, e.g., dioxane and tetrahydrofuran, and acyclic alkyl ethers, e.g., diglyme (diethylene glycol dimethyl ether).

After the addition of solvent to the reaction vessel is complete, the ortho-chlorobenzoic acid in a suitable solvent as defined above is added to the reaction vessel. From about 0.5 mole to about 2 moles of o-chlorobenzoic acid per mole of the phosphine previously added is employed. Any time lapse between addition of the solvent and subsequent addition of substituted benzoic acid is not material, however, it is important that once addition of the benzoic acid is initiated, there be substantially immediate intimate contacting of the benzoic acid and the sodium diphenylphosphide/phenyl sodium mixture. The faster the addition rate of the acid, the higher will be the yield of the ortho-isomer. When all of the acid has been added to the reaction vessel, the reaction temperature is then gradually increased and the mixture is maintained under agitation until reaction of the o-chlorobenzoic acid is complete.

The final step in the process is acidification of the hot solution with a strong mineral acid, e.g., hydrochloric, to thereby recover the orthodihydrocarbylphosphinobenzoic acid. It is generally advantageous, although not required, to add water and remove the organic solvent prior to acidification. After acidification the aqueous phase is removed and the solid product is then recovered by conventional techniques, e.g., washing, separating, and drying.

The process of this invention is used in the production of ortho-dihydrocarbylphosphinobenzoic acids, useful, for example, as a catalyst component in the oligomerization of ethylene to produce long-chain, linear, alpha-olefins which are useful in the production of detergents.

To further illustrate the process of the invention, the following examples are provided. It should be understood that the details thereof are not to be regarded as limitations.

ILLUSTRATIVE EMBODIMENT I

A. To a 3 liter 3-necked flask equipped with a glass bladed stirrer, still head, thermometer, reflux condenser and heating mantle was added 1.5 l (liters) of liquid anhydrous ammonia. The flask had initially been purged with nitrogen and dry ice-cooled acetone was circulated through the reflux condenser to maintain the contents of the flask at approximately −30°C. To the liquid ammonia solution was added 23 g. (1.0 gram atom) of sodium which had been freed of protective oil by washing with pentane and drying in a stream of nitrogen. The sodium was added in portions over a period of 15 minutes and the resulting intensely blue solution was stirred for an additional 15 minutes.

To this mixture 131 g. (0.5 mole) of triphenylphosphine was added slowly so as to maintain a gentle reflux. The reaction was quite exothermic and 30–40 minutes was required to complete the addition. The resulting dark red solution was then stirred for 90 minutes. A solution of o-chlorobenzoic acid 78.5 g (0.5 m) in dry tetrahydrofuran (250 ml) was added over a period of 53 seconds. More tetrahydrofuran solvent (1400 ml) was added and the contents of the flask were then heated to remove the ammonia. When the internal temperature reached 10°C the condenser coolant was switched to water and the mixture was heated under reflux (initial temperature 67°C) for 22 hours. During this period the reaction mixture passes through a viscous, difficultly stirrable phase. As the reaction progresses the viscosity decreases and stirring improves.

The reaction mixture was worked up by addition of hot deoxygenated water and removal of the solvent as an azeotrope (bp 87°). Water was added to maintain the liquid level. When the stillhead temperature had reached 94°C a total of 2.0 liters of water had been added and 1850 ml of distillate had been obtained. The kettle temperature was 97°C. The flask was cooled to 80° and the aqueous mixture extracted three times with 100 ml portions of perchloroethylene. Entrained chlorocarbon was removed azeotropically. The o-diphenylphosphinobenzoic acid was obtained by addition of 6N HCl to the reaction flask until no further clouding occurred (85 ml). The supernatant liquor was decanted and the crude product washed with boiling water. After drying the product weighed 113 g. (74 percent yield). Analysis of the product as to isomer distribution was made by silylation subsequent and chromatographic analysis on a 6 ft SE-30 column at 265°C. The product analyzed approximately 99 percent ortho-diphenylphosphinobenzoic acid. The melting point was determined to be 175°–178°C.

B. The above procedure was repeated except that the o-chlorobenzoic acid was added over a period of 85 minutes. The crude product, 117.4 g. (77 percent yield) had a melting point of 135°–163°C and was found to contain 31 percent meta-diphenylphosphinobenzoic acid. The ortho-isomer accounted for only 69 percent of the product.

C. The above procedure was repeated except that dioxane was used as a solvent instead of tetrahydrofuran. The data are summarized in the following Table I.

TABLE I

| O-chlorobenzoic acid addition time | Reactor conditions | | | M.P. °C. | Diphenylphosphinebenzoic acid isomer distribution | |
|---|---|---|---|---|---|---|
| | Temp., °C. | Time, hrs. | Percent yield | | Ortho | Meta |
| Minutes: | | | | | | |
| 8 | 101 | 5 | 67+ | 174–178 | 96 | 4 |
| 20 | 101 | 5 | 75 | 160–175 | 88 | 12 |
| 60 | 101 | 5 | 73 | 135–160 | 65 | 35 |

From the above data it is apparent that the yield of the ortho isomer is higher when the o-chlorobenzoic acid is added at a more rapid rate.

ILLUSTRATIVE EMBODIMENT II

A. To a 300 ml Magnedrive autoclave was charged 0.25 millimoles $NiCl_2.6H_2O$, 0.125–0.25 millimoles of o-diphenylphoshinobenzoic acid, 65 ml 1,4-butanediol and 500 psig of ethylene. After the autoclave was maintained at 25°C for 15 minutes, 0.50 millimoles of sodium borohydride (0.5 molar solution in N,N-dimethylacetamide) and an additional 600 psig of ethylene (total ethylene pressure 1100 psig) were charged to the autoclave. The autoclave was maintained at 25°C for 15 minutes and then heated to 75°C and maintained at a pressure of 1100 psig by continual addition of ethylene until ethylene uptake ceased.

The rate of ethylene oligomer formation was 490 grams oligomers per gram nickel per hour. The oligomer products consisted of 32.5 percent w $C_{12}$–$C_{20}$ oligomers. Gas liquid chromatographic analysis of the $C_{12}$ fraction of the oligomers showed that the $C_{12}$ olefins consisted of about 98 percent linear α-olefins, about 1 percent linear internal olefins and about 1 percent branched olefins.

B. For comparative purposes the procedure of part A was repeated except that meta-diphenylphosphinobenzoic acid was used in the catalyst composition instead of the ortho-isomer. No oligomer products were formed.

We claim as our invention:

1. The process of preparing ortho-dihydrocarbylphosphinobenzoic acid substantially free from the meta-dihydrocarbylphosphinobenzoic acid isomer which comprises,
   a. contact of an aryldihydrocarbylphosphine and sodium in liquid ammonia,
   b. addition thereto of an inert solvent, and
   c. substantially immediate, intimate contact of the mixture with ortho-chlorobenzoic acid in an inert solvent solution, and recovering ortho-dihydrocarbylphosphinobenzoic acid from the reaction mixture by subsequent treatment with mineral acid.

2. The process according to claim 1 wherein the aryl-dihydrocarbylphosphine is triphenylphosphine.

3. The process according to claim 1 wherein the aryl-dihydrocarbylphosphine is phenyldibutylphosphine.

4. The process according to claim 2 wherein the inert solvent is diethyleneglycol dimethyl ether.

5. The process according to claim 2 wherein the inert solvent is anhydrous dioxane.

6. The process according to claim 2 wherein the inert solvent is di-n-butyl ether.

* * * * *

PO-1050
(5/69)

UNITED STATES PATENT OFFICE
CERTIFICATE OF CORRECTION

Patent No. 3,758,558                         Dated September 11, 1973

Inventor(s) RONALD F. MASON and GORDON E. WICKER

It is certified that error appears in the above-identified patent and that said Letters Patent are hereby corrected as shown below:

In the Abstract, line 5 which reads "an ortho-chlorobenzoate" should read --ortho-chlorobenzoic acid--;

In Column 1, lines 58 through 60, the phrase which reads "The reaction mixture wherein sodium dihydrocarbylphosphide is rapidly and intimately contacted" should read --Rapidly and intimately contacting the mixture containing sodium dihydrocarbylphosphide and phenyl sodium--;

In Column 2, lines 53-61, the compound in the equation which reads

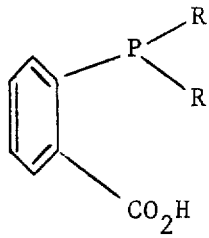

Should read

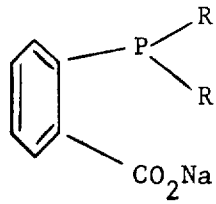

In Column 3, line 3, to the sentence ending with "anion". should be added the phrase --as is illustrated by the following equation--;

Claim 3, Column 6, lines 60 through 63, should be cancelled.

UNITED STATES PATENT OFFICE
CERTIFICATE OF CORRECTION

Patent No. 3,758,558     Dated  September 11, 1973

Inventor(s)    Ronald F. Mason and Gordon E. Wicker    Page - 2

It is certified that error appears in the above-identified patent and that said Letters Patent are hereby corrected as shown below:

On the cover sheet, after the abstract, "6 Claims" should read -- 5 Claims --.

Signed and sealed this 19th day of March 1974.

(SEAL)
Attest:

EDWARD M. FLETCHER, JR.            C. MARSHALL DANN
Attesting Officer                  Commissioner of Patents